(12) United States Patent
Smith et al.

(10) Patent No.: US 10,608,943 B2
(45) Date of Patent: Mar. 31, 2020

(54) DYNAMIC BUFFER MANAGEMENT IN MULTI-CLIENT TOKEN FLOW CONTROL ROUTERS

(71) Applicant: Advanced Micro Devices, Inc., Sunnyvale, CA (US)

(72) Inventors: Alan Dodson Smith, Austin, TX (US); Chintan S. Patel, Bee Cave, TX (US); Eric Christopher Morton, Austin, TX (US); Vydhyanathan Kalyanasundharam, San Jose, CA (US); Narendra Kamat, West Lafayette, IN (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 26 days.

(21) Appl. No.: 15/796,528

(22) Filed: Oct. 27, 2017

(65) Prior Publication Data
US 2019/0132249 A1    May 2, 2019

(51) Int. Cl.
*G01R 31/08*    (2020.01)
*G06F 11/00*    (2006.01)
*G08C 15/00*    (2006.01)
*H04J 1/16*    (2006.01)
*H04J 3/14*    (2006.01)
*H04L 1/00*    (2006.01)
(Continued)

(52) U.S. Cl.
CPC ......... *H04L 47/125* (2013.01); *G06F 9/5011* (2013.01); *G06F 13/36* (2013.01); *H04L 47/50* (2013.01)

(58) Field of Classification Search
None
See application file for complete search history.

(56) References Cited

U.S. PATENT DOCUMENTS 4,964,113 A * 10/1990 Geyer ............... H04L 12/433
                                                    370/452
5,309,428 A *  5/1994 Copley .............. G01R 29/26
                                                    370/245

(Continued)

OTHER PUBLICATIONS

International Search Report and Written Opinion in International Application No. PCT/US2018/051555, dated Dec. 11, 2018, 12 pages.

*Primary Examiner* — Stephen M D Agosta
(74) *Attorney, Agent, or Firm* — Kowert Hood Munyon Rankin and Goetzel PC; Rory D. Rankin

(57) ABSTRACT

Systems, apparatuses, and methods for dynamic buffer management in multi-client token flow control routers are disclosed. A system includes at least one or more processing units, a memory, and a communication fabric with a plurality of routers coupled to the processing unit(s) and the memory. A router servicing multiple active clients allocates a first number of tokens to each active client. The first number of tokens is less than a second number of tokens needed to saturate the bandwidth of each client to the router. The router also allocates a third number of tokens to a free pool, with tokens from the free pool being dynamically allocated to different clients. The third number of tokens is equal to the difference between the second number of tokens and the first number of tokens. An advantage of this approach is reducing the amount of buffer space needed at the router.

17 Claims, 13 Drawing Sheets

(51) Int. Cl.
*H04L 12/26* (2006.01)
*H04L 12/803* (2013.01)
*G06F 9/50* (2006.01)
*G06F 13/36* (2006.01)
*H04L 12/863* (2013.01)

(56) References Cited

U.S. PATENT DOCUMENTS

| | | | | |
|---|---|---|---|---|
| 5,506,844 A | * | 4/1996 | Rao | H04J 3/1688 370/468 |
| 5,528,591 A | | 6/1996 | Lauer | |
| 5,553,076 A | * | 9/1996 | Behtash | H04W 28/26 370/311 |
| 5,592,622 A | | 1/1997 | Isfeld et al. | |
| 5,708,974 A | | 1/1998 | Smith | |
| 5,838,994 A | | 11/1998 | Valizadeh | |
| 5,886,992 A | * | 3/1999 | Raatikainen | H04L 12/43 370/410 |
| 6,678,813 B1 | | 1/2004 | Le | |
| 7,315,552 B2 | * | 1/2008 | Kalkunte | H04L 12/5601 370/360 |
| 8,103,788 B1 | | 1/2012 | Miranda | |
| 8,160,072 B1 | * | 4/2012 | Gnanasekaran | H04L 47/2441 370/229 |
| 2002/0049901 A1 | | 4/2002 | Carvey | |
| 2003/0120705 A1 | * | 6/2003 | Chen | H04L 47/521 718/104 |
| 2007/0153697 A1 | * | 7/2007 | Kwan | H04L 47/215 370/235 |
| 2009/0285217 A1 | * | 11/2009 | Frink | H04N 7/52 370/394 |
| 2013/0132603 A1 | * | 5/2013 | Cohen | H04L 1/1841 709/231 |
| 2015/0071075 A1 | * | 3/2015 | Ramakrishnan | H04L 65/4069 370/236 |
| 2016/0127779 A1 | * | 5/2016 | Elstermann | H04N 21/43 725/116 |

* cited by examiner

Lookup Table 1100

| Numerator | Denominator | Fractional Pointer | Result | N Value |
|---|---|---|---|---|
| ⋮ | ⋮ | ⋮ | ⋮ | ⋮ |
| 4 | 3 | 0 | 1 | 3 |
| 4 | 3 | 1 | 1 | 3 |
| 4 | 3 | 2 | 2 | 3 |
| ⋮ | ⋮ | ⋮ | ⋮ | ⋮ |
| 7 | 5 | 0 | 1 | 5 |
| 7 | 5 | 1 | 1 | 5 |
| 7 | 5 | 2 | 1 | 5 |
| 7 | 5 | 3 | 2 | 5 |
| 7 | 5 | 4 | 2 | 5 |
| ⋮ | ⋮ | ⋮ | ⋮ | ⋮ |

Numerator, Denominator, Fractional Pointer Combination Index →

→ Result and N Value

FIG. 11

DYNAMIC BUFFER MANAGEMENT IN MULTI-CLIENT TOKEN FLOW CONTROL ROUTERS

BACKGROUND

Description of the Related Art

Computing systems are increasingly integrating large numbers of different types of components on a single chip or a multi-chip module. The complexity and power consumption of a system increases with the number of different types of components. Often, these components are connected together via switches, routers, communication buses, bridges, buffers, controllers, coherent devices, and other links. The combination of these interconnecting components is referred to herein as a "communication fabric", or "fabric" for short. Generally speaking, the fabric facilitates communication by routing messages between a plurality of components on an integrated circuit (i.e., chip) or multi-chip module. Examples of messages communicated over a fabric include memory access requests, status updates, data transfers, coherency probes, coherency probe responses, and the like.

Integrating large numbers of different types of components on a single chip or on a multi-chip module often results in irregular fabric topologies. With irregular fabric topologies, implementing fairness in the fabric routers can be challenging. In lossless flow-controlled networks that employ token flow control, tokens released by a receiver provide the transmitter with guaranteed buffer availability at the receiver. For clients that require a large amount of bandwidth, the number of tokens that the router must release can be large depending on the physical distance between client and router. In multi-client networks where a router handles multiple high-bandwidth clients that target a shared destination, the buffer sizing at the router can be highly wasteful.

BRIEF DESCRIPTION OF THE DRAWINGS

The advantages of the methods and mechanisms described herein may be better understood by referring to the following description in conjunction with the accompanying drawings, in which:

FIG. 11 illustrates one embodiment of a fractional pointer lookup table.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for dynamic buffer management in multi-client token flow control routers are disclosed herein. In one embodiment, a system includes at least one or more processing units, a communication fabric, and one or more memory devices. The fabric is coupled to the processing unit(s) and memory device(s), and the fabric includes a plurality of routers. Many of the routers will service multiple clients that target a common destination. For each of these routers, the router allocates a first number of flow control tokens to each active client, wherein the first number of tokens is at least one but less than a second number of tokens needed to saturate the bandwidth to the router and/or the common destination. The router allocates a third number of tokens to a free pool, with the free pool tokens available for dynamic allocation to any of the active clients. In one embodiment, the third number of tokens is equal to the difference between the second number of tokens and the first number of tokens.

In one embodiment, the router defines a token threshold for each client, with the token threshold limiting the number of tokens that can be allocated to the corresponding client per unit time or in a given round of token allocation. In one embodiment, the token threshold is maintained between the first and second number of tokens. In one embodiment, the router dynamically changes the token threshold depending on the activity level of each of the clients. In one embodiment, the router chooses equality by raising the token threshold uniformly across all active clients. In other embodiments, the router can prioritize certain clients over others. In one embodiment, the router assigns a programmable arbitration weight to each client and then uses the programmable arbitration weight to modify the token threshold for each client.

Figure 1:
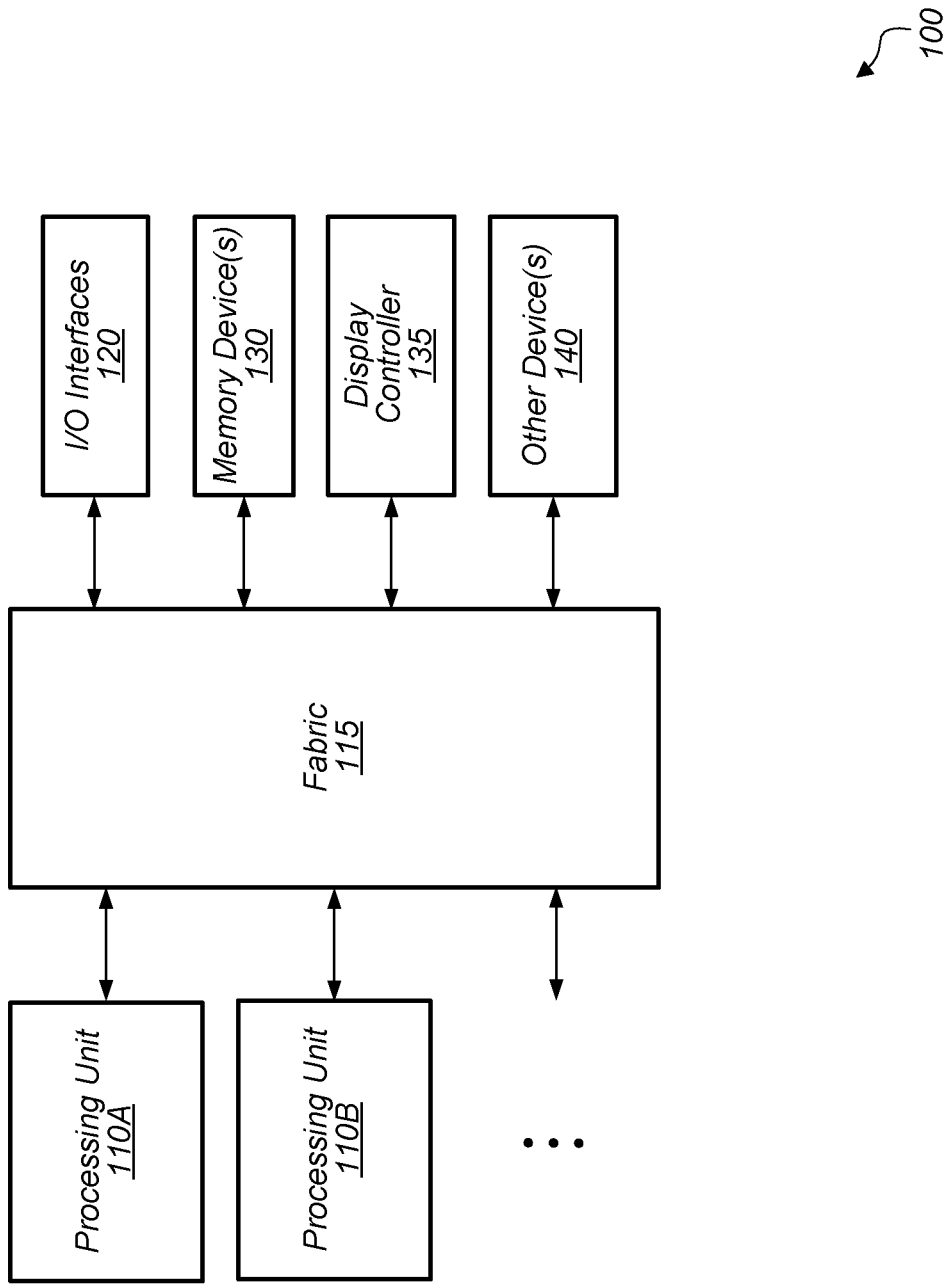
FIG. 1 is a block diagram of one embodiment of a computing system.

Referring now to FIG. 1, a block diagram of one embodiment of a computing system 100 is shown. In one embodiment, computing system 100 includes at least processing units 110A-B, fabric 115, input/output (I/O) interfaces 120, memory device(s) 130, display controller 135, and other device(s) 140. In other embodiments, computing system 100 can include other components and/or computing system 100 can be arranged differently. Processing units 110A-B are representative of any number and type of processing units. For example, in one embodiment, processing unit 110A is a central processing unit (CPU) and processing unit 110B is a graphics processing unit (GPU). In other embodiments, processing units 110A-B can include other numbers and types of processing units (e.g., digital signal processor (DSP), field programmable gate array (FPGA), application specific integrated circuit (ASIC)).

Fabric 115 is representative of any communication interconnect and any protocol for communicating among the components of the system 100. Fabric 115 provides the data paths, switches, routers, multiplexers, controllers, and other logic that connect the processing units 110A-B, I/O interfaces 120, memory device(s) 130, and other device(s) 140 to each other. Fabric 115 handles the request, response, and data traffic, as well as probe traffic to facilitate coherency. In various embodiments, communications using the fabric utilize packets with a predefined format. As such, this traffic can be referred to herein as "packets". Fabric 115 also handles interrupt request routing and configuration access paths to the various components of system 100. Fabric 115 can be bus-based, including shared bus configurations, cross bar configurations, and hierarchical buses with bridges. Fabric 115 can also be packet-based, and can be hierarchical with bridges, cross bar, point-to-point, or other interconnects. From the point of view of fabric 115, the other components of system 100 can be referred to as "clients". Fabric 115 is configured to process requests and other packets generated by various clients and pass these on to other clients.

In one embodiment, fabric 115 includes a plurality of routers. The routers can also be referred to as crossbars, switches, or arbitration points. In one embodiment, transmission and receipt of packets through the routers of fabric 115 are flow controlled using a token based scheme. In one embodiment, each transmitter uses tokens to keep a count of the packet buffers available in each virtual channel (VC) at the receiver, where a token represents a guaranteed buffer at the receiver. In one embodiment, the receiver distributes a programmable number of tokens during initialization. When a packet is sent, the transmitter decrements the token count. When the router routes the packet forward to the next hop, or the destination, the router de-allocates a packet entry and then a token becomes available.

In one embodiment, multiple clients send packets to a common destination through a given router, and each client needs $T_{max}$ tokens per unit time to saturate bandwidth to the destination. The unit of time for tracking token usage can be based on a number of clock cycles or otherwise. Rather than allocating $T_{max}$ tokens to each client, $T_{min}$ tokens are allocated to each client. The value of $T_{min}$ is at least one but less than $T_{max}$. Also, a free pool of tokens is available in the given router for the clients, where the number of free pool tokens is $T_{fp}=T_{max}-T_{min}$. Free pool tokens can be distributed to any of the clients at the given router's discretion. The total buffering requirement in the given router is $(N-1)*T_{min}+T_{max}$ packets, where N is the number of clients sending packets to the common destination. This embodiment provides significant buffer savings in the given router when compared to the state-of-the-art where the total buffering requirement is $N*T_{max}$ packets.

Memory device(s) 130 are representative of any number and type of memory devices. For example, the type of memory in memory device(s) 130 can include Dynamic Random Access Memory (DRAM), Static Random Access Memory (SRAM), NAND Flash memory, NOR flash memory, Ferroelectric Random Access Memory (FeRAM), or others. Memory device(s) 130 are accessible by processing units 110A-B, I/O interfaces 120, display controller 135, and other device(s) 140 via fabric 115. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth. Other device(s) 140 are representative of any number and type of devices (e.g., multimedia device, video codec).

In various embodiments, computing system 100 can be a computer, laptop, mobile device, server or any of various other types of computing systems or devices. It is noted that the number of components of computing system 100 can vary from embodiment to embodiment. There can be more or fewer of each component than the number shown in FIG. 1. It is also noted that computing system 100 can include other components not shown in FIG. 1. Additionally, in other embodiments, computing system 100 can be structured in other ways than shown in FIG. 1.

Figure 2:
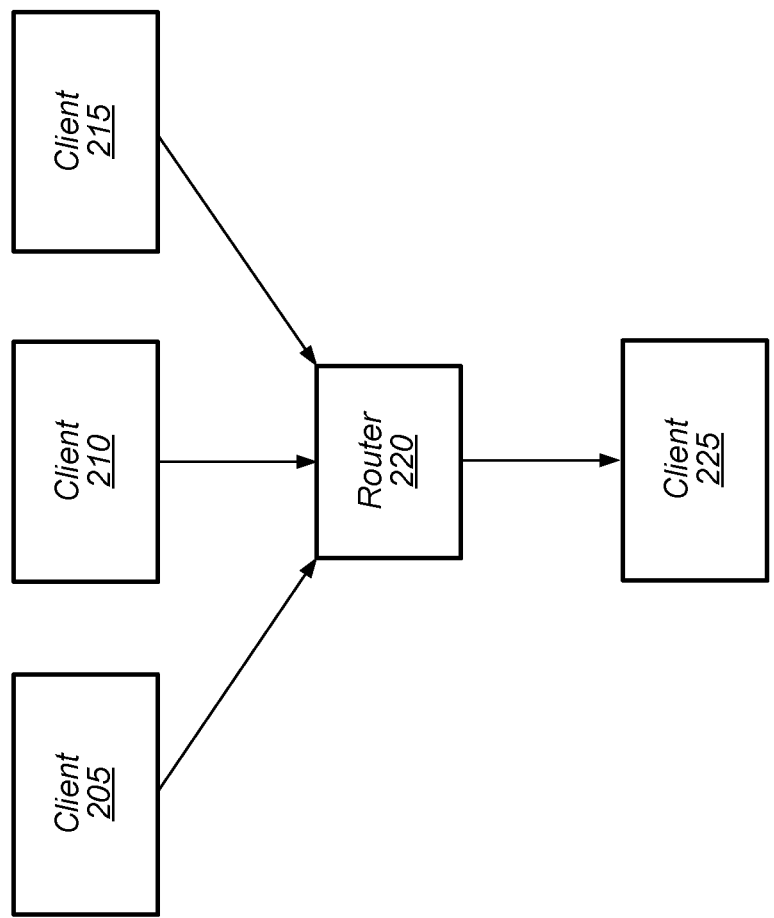
FIG. 2 is a block diagram of another embodiment of a computing system.

FIG. 2 is a block diagram of another embodiment of a computing system 200. As shown in FIG. 2, system 200 includes clients 205, 210, 215, and 225 coupled to router 220. In one embodiment, clients 205, 210, and 215 target client 225 through router 220. It is assumed for the purposes of this discussion that $T_{max}$ tokens are needed on each interface per unit time to saturate bandwidth on the interface. In isolation, each of the three clients 205, 210, and 215 can consume the full bandwidth provided by router 220 toward client 225 and therefore need $T_{max}$ tokens each. This requires router 220 to be sized to include $3*T_{max}$ buffers even though router 220 only needs $T_{max}$ tokens to fully utilize the bandwidth provided by client 225.

Further, once the multiple clients 205, 210, and 215 are active, there is typically no ability to control the bandwidth sharing if each client is statically allocated maximum bandwidth. Assuming a fair arbitration policy in router 220, all three clients would get equal bandwidth. This might not be desirable if clients 205, 210, and 215 have different system-level priorities. In one embodiment, a dynamic token allocation scheme is implemented by router 220 which allows for area savings as well as the ability to regulate bandwidth distribution.

In one embodiment, instead of statically allocating $T_{max}$ tokens to each of clients 205, 210, and 215, router 220 allocates $T_{min}$ tokens to each of clients 205, 210, and 215. Depending on the embodiment, router 220 can allocate tokens to clients 205, 210, and 215 by conveying corresponding signals on the main data interface or on a separate channel. The minimum value of $T_{min}$ is 1, and the maximum value of $T_{min}$ is $T_{max}$. In addition, router 220 allocates $T_{fp}$ free pool tokens where $T_{fp}=T_{max}-T_{min}$. These free pool tokens can be distributed to any of the clients 205, 210, and 215 at the discretion of router 220. Router 220 is also capable of recalling tokens that it deems are not in use. The total buffering requirement in router 220 based on this approach is $2*T_{min}+T_{max}$. Accordingly, in one embodiment, router 220 includes one or more buffers sized to store a number of packets equal to the minimum value per client $T_{min}$ plus a number of packets equal to the number of tokens in the free pool $T_{fp}$. If $T_{min}=1$, then the total buffering requirement is equal to the size of $T_{max}+2$ packets. This embodiment provides significant buffer savings when compared to the state-of-the-art where the total buffering requirement is $3*T_{max}$ packets.

In one embodiment, router 220 defines a token threshold per client as $T_{thr}$, with $T_{thr}$ maintained between $T_{max}$ and $T_{min}$. $T_{thr}$ defines the maximum number of tokens per unit time or per token allocation round that can be allocated by router 220 for a given client. Router 220 can then dynamically change $T_{thr}$ depending on the activity levels of each of the clients 205, 210, and 215. In one embodiment, router 220 chooses equality by raising $T_{thr}$ uniformly across all active clients. In another embodiment, router 220 statically prioritizes certain clients over others. This can be achieved by assigning a programmable arbitration weight, $W_{arb}$, to each client.

In one embodiment, router 220 uses $W_{arb}$ to modify $T_{thr}$. For example, if two clients are contending for the same shared resource, and if one of the clients has a higher $W_{arb}$ than the other, then router 220 modifies the $T_{thr}$ of each client accordingly. In another embodiment, router 220 uses $W_{arb}$ to affect token consumption from the free pool. As multiple clients become active, and start drawing tokens from the free pool, biasing the token distribution using $W_{arb}$ can achieve the desired bandwidth distribution.

In one embodiment, router 220 implements a weighted round-robin arbiter to distribute tokens to clients 205, 210, and 215. For example, a weighted round-robin arbiter can be implemented by having $W_{arb}$ specify the reset value of a counter, with the counter representing the number of tokens to allocate to a client per round. If the value of a counter is greater than zero, then the corresponding client is asking for a token. For every token that is allocated, the counter corresponding to the client is decremented by one. A pointer, HeadofLine, is utilized to point to the client which will receive the next available token. HeadofLine moves on to the next client when the counter for a given client is zero. Once HeadofLine moves away from a client, the counter corresponding to this client is reset. Router 220 can also support priority escalation for certain clients by changing $T_{thr}$ at a different rate than the other clients. Once router 220 detects that a client is no longer active, router 220 can signal the client to release back tokens until it reaches $T_{min}$, which brings router 220 back to steady-state where it has tokens in the Free Pool. Router 220 includes any suitable combination of software and/or hardware to implement the techniques described herein.

In one embodiment, if more than one token becomes available at the same time, router 220 gives one token to the client pointed to by HeadofLine, and router 220 gives another token to the next client having a counter greater than zero after the client pointed to by HeadofLine. In one embodiment, the HeadofLine pointer moves only when the client being pointed to has its counter hit zero.

Figure 3:
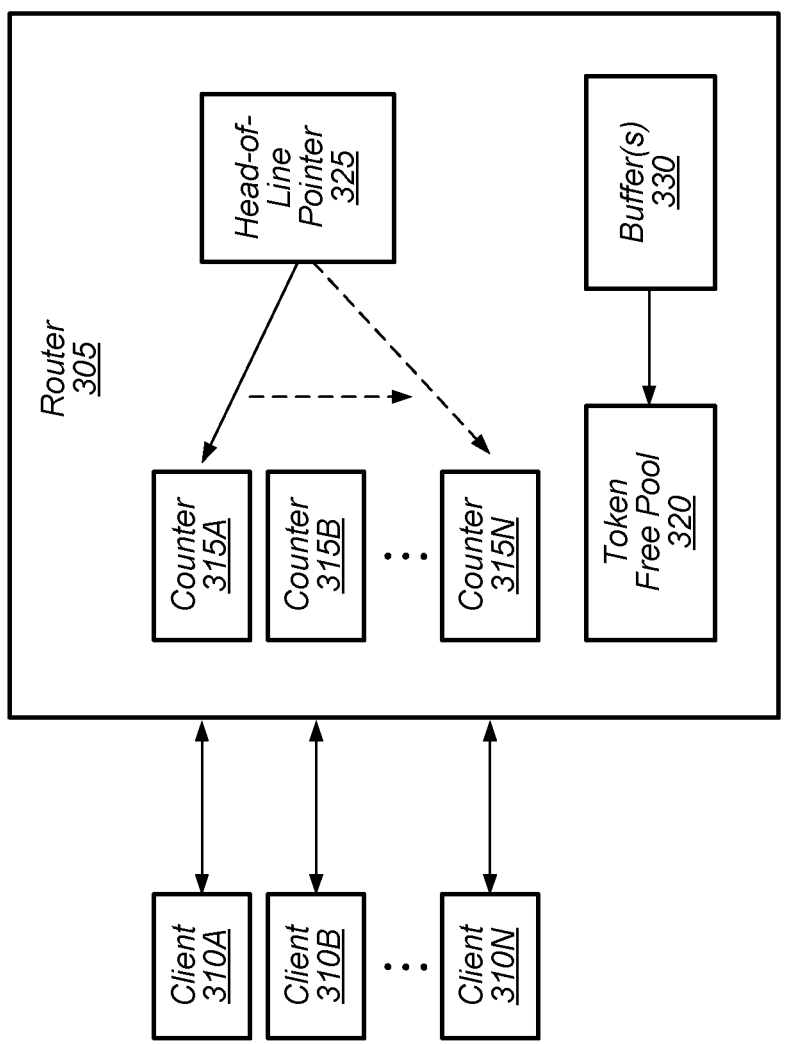
FIG. 3 is a block diagram of one embodiment of a token flow control router for implementing a weighted round-robin arbiter.

Referring now to FIG. 3, a block diagram of one embodiment of a router 305 for implementing a weighted round-robin arbiter is shown. In one embodiment, router 305 includes a set of per-client token counters 315A-N which are initialized at the beginning of each round-robin token allocation round. In one embodiment, router 305 initializes each counter 315A-N to the same value to distribute tokens uniformly to clients 310A-N. In another embodiment, router 305 initializes counters 315A-N to different values based on a priority or other metric assigned to the corresponding clients 310A-N. For example, in this embodiment, each counter 315A-N is initialized to a given value based on a programmable arbitration weight assigned to the corresponding client 310A-N. It is noted that router 305 can dynamically change the scheme utilized for token allocation to clients 310A-N depending on changing conditions or in response to being reprogrammed by software.

In one embodiment, the number of tokens allocated in token free pool 320 is based on the available buffer space in buffer(s) 330. As packets are forwarded from router 305 and space becomes available in buffer(s) 330, tokens are added to token free pool 320. In one embodiment, counters 315A-N are initialized to values by splitting up the tokens in token free pool 320 among clients 310A-N based on programmable arbitration weights assigned to clients 310A-N. After the counters 315A-N are initialized, round-robin allocation of tokens can be implemented. Accordingly, during round-robin allocation, head-of-line pointer 325 starts by pointing to one of the counters 315A-N and then allocating tokens to the corresponding client 310A-N as long as the counter value is greater than zero. For each token allocated to a client, the corresponding counter is decremented. When the counter value is equal to zero, head-of-line pointer 325 resets the counter, and then head-of-line pointer 325 moves to the next counter. Head-of-line pointer 325 moves through the counters 315A-N in a round-robin fashion, allocating tokens to clients whose counters are non-zero. When the current round of token allocation ends, another round of token allocation commences.

Figure 4:
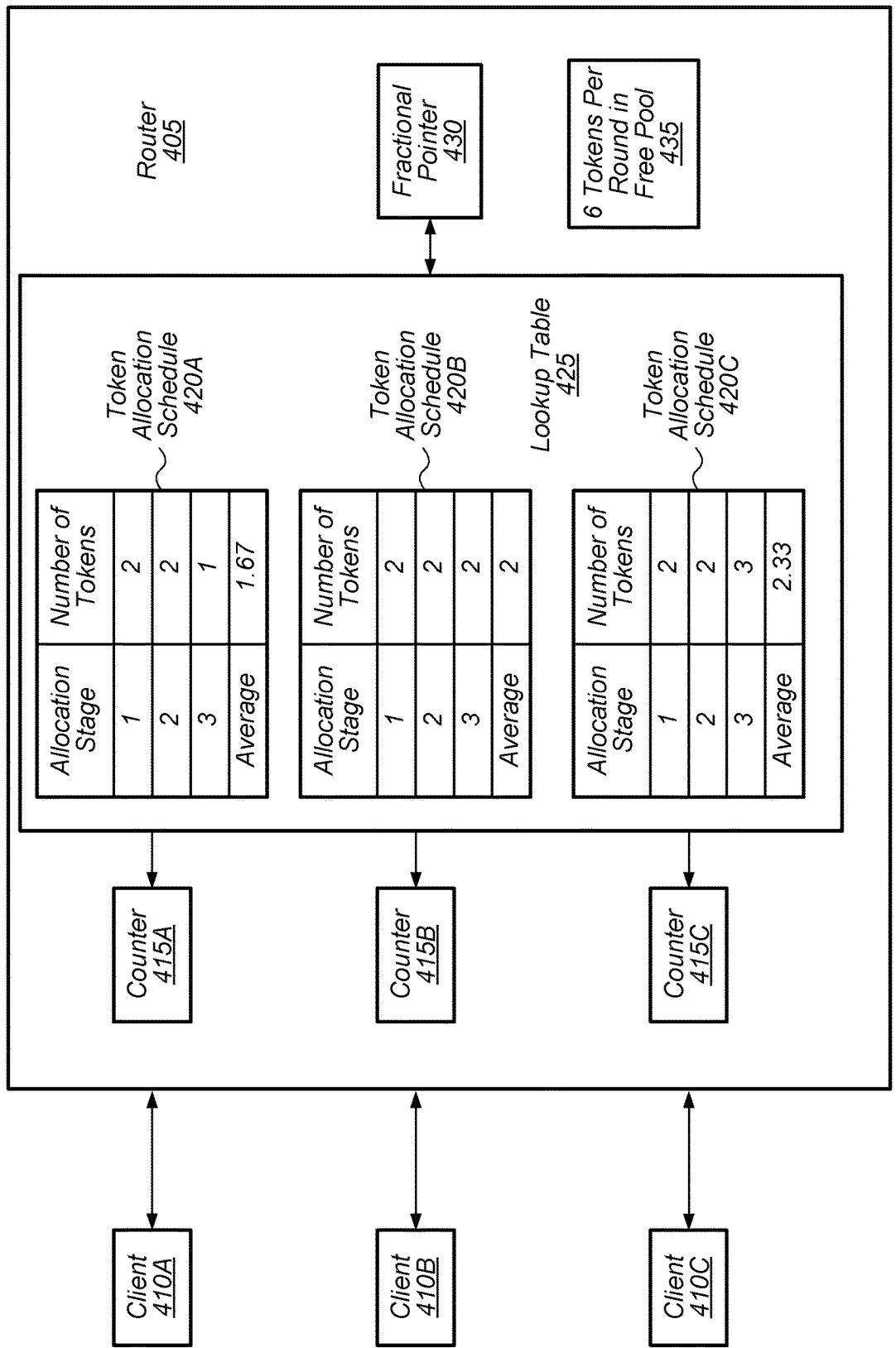
FIG. 4 is a block diagram of one embodiment of a token flow control router using a fractional pointer with a lookup table.

Turning now to FIG. 4, a block diagram of one embodiment of a token flow control router 405 using a fractional pointer 430 with lookup table 425 is shown. In one embodiment, token flow control router 405 includes three counters 415A-C to track the number of tokens to allocate to three clients 410A-C coupled to router 405. It is assumed for the purposes of this discussion that clients 410A-C are targeting a common destination. In other embodiments, token flow control router 405 can include other numbers of counters for other numbers of clients.

For most networks, the number of tokens needed to saturate bandwidth $T_{max}$ tends to be small. When balancing bandwidth between clients 410A-C by setting $T_{thr}$ in between $T_{max}$ and $T_{min}$, using integer division to determine $T_{thr}$ results in inaccuracies which can skew the balance heavily. For example, in one embodiment, if clients 410A-C have $T_{max}$ of 5, 6 and 7, respectively, then router 405 would set the $T_{thr}$ of clients 410A-C to be 1.67, 2 and 2.33 tokens, respectively. However, since tokens can only be integers, this is not feasible. One solution would be to use rounding to the nearest integer, which would make the $T_{thr}$ be 2 for each of clients 410A-C. This would result in client 410A getting 40% (⅖) of its requested bandwidth, client 410B getting 33% (²⁄₆) of its requested bandwidth, and client 410C getting 29% (²⁄₇) of its requested bandwidth.

It is assumed for the purposes of this illustrated embodiment that there are six tokens in free pool 435 to allocate per round-robin stage to clients 410A-C. Rather than allocating two tokens per round to each client 410A-C, router 405 utilizes fractional pointer 430 to access lookup table 425 to achieve a token allocation closer to the bandwidth requested by clients 410A-C. The schedules 420A-C correspond to the tokens allocated to clients 410A-C so as to divide the bandwidth fairly among clients 410A-C based on their bandwidth requests. Accordingly, two tokens will be allocated to client 410A for the first two allocation stages as shown in token allocation schedule 420A, with one token allocated to client 410A for the third allocation stage. This allocation pattern results in client 410A receiving an average of 1.67 tokens per allocation stage. This allocation pattern can continue for each set of three allocation stages.

For client 410B, token allocation schedule 420B indicates that two tokens should be allocated per stage. For client 410C, token allocation schedule 420C indicates the number of tokens allocated per stage, which is two tokens for the first two stages and then three tokens for the third stage. This allocation pattern results in client 410C receiving an average of 2.33 tokens per allocation stage. This allocation pattern can continue for each set of three allocation stages. It should be understood that the example token allocation patterns shown in FIG. 4 are indicative of one particular embodiment. In other embodiments, other numbers of tokens can be available, other numbers of clients can be coupled to router 405, and/or the tokens can be divided among clients using other allocation patterns.

Figure 5:
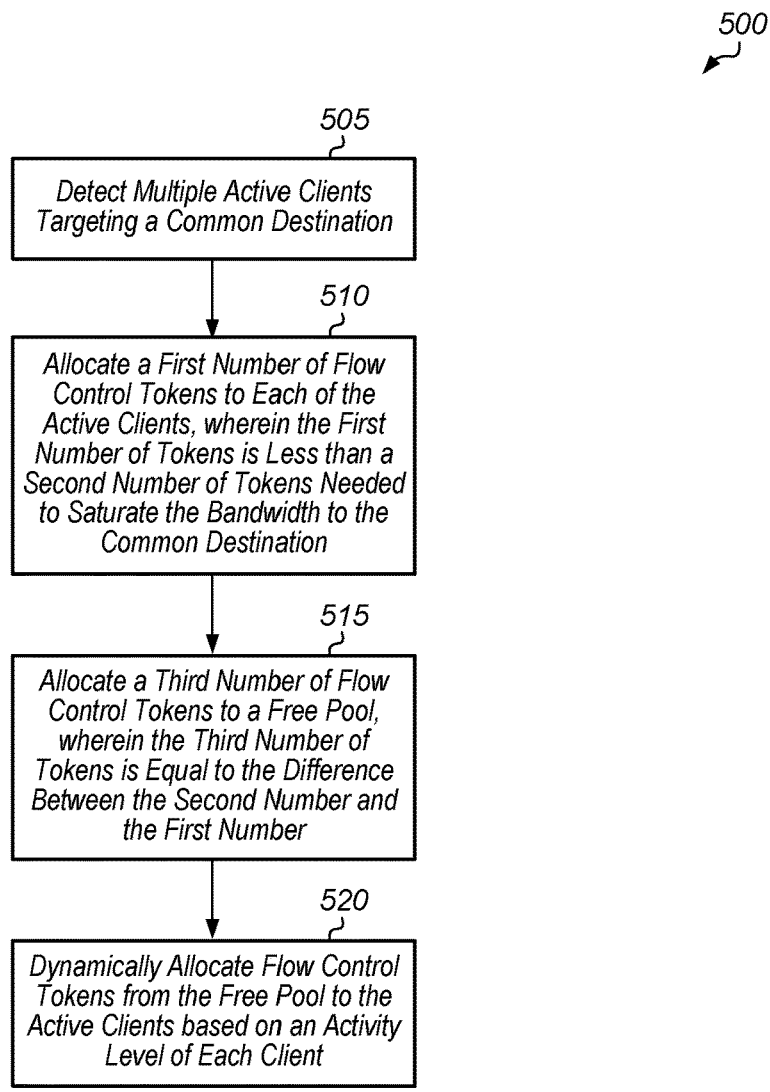
FIG. 5 is a generalized flow diagram illustrating one embodiment of a method for dynamic buffer management in multi-client token flow control routers.

Referring now to FIG. 5, one embodiment of a method 500 for dynamic buffer management in multi-client token flow control routers is shown. For purposes of discussion, the steps in this embodiment and those of FIGS. 6-9 and 11-12 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A token flow control router detects multiple active clients targeting a common destination (block 505). In response to detecting the multiple active clients targeting the common destination, the router allocates a first number of flow control tokens to each of the active clients, wherein the first number of tokens is less than a second number of tokens needed to saturate the bandwidth to the common destination (block 510). It is noted that the first number of tokens is greater than or equal to one token. Next, the router allocates a third number of flow control tokens to a free pool, wherein the third number of tokens is equal to the difference between the second number and the first number (block 515). Then, the router dynamically allocates tokens from the free pool to the active clients (block 520). In one embodiment, the router dynamically allocates tokens from the free pool to the active clients based on an activity level of each client. In another embodiment, the router dynamically allocates tokens from the free pool to the active clients based on a priority level assigned to each client. In a further embodiment, the router dynamically allocates tokens from the free pool to the active clients based on an activity level of each client and a priority level assigned to each client. In other embodiments, the router can utilize other techniques for dynamically allocating tokens from the free pool to the active clients. After block 520, method 500 ends.

Figure 6:
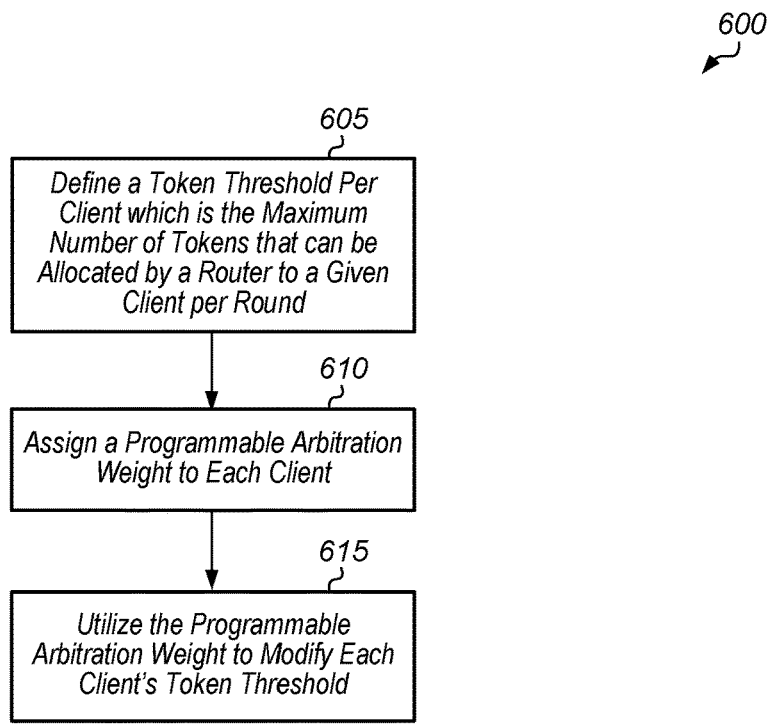
FIG. 6 is a generalized flow diagram illustrating one embodiment of a method for dynamically allocating flow control tokens to clients.

Turning now to FIG. 6, one embodiment of a method 600 for dynamically allocating flow control tokens to clients is shown. A router defines a token threshold per client which is the maximum number of tokens that can be allocated by the router to a given client per round (block 605). Also, the router assigns a programmable arbitration weight to each client (block 610). Then, the router utilizes the programmable arbitration weight to modify the token threshold per client (block 615). For example, in one embodiment, if two clients are contending for the same shared resource and if a first client has a higher arbitration weight than the second client, then the token threshold for the first client will be increased while the token threshold for the second client is decreased or remains the same. In another embodiment, the router utilizes the arbitration weight to affect token consumption from a free pool of tokens. As multiple clients become active and start drawing tokens from the free pool, biasing the token distribution using the arbitration weights of the clients can help achieve a desired bandwidth distribution. After block 615, method 600 ends.

Figure 7:
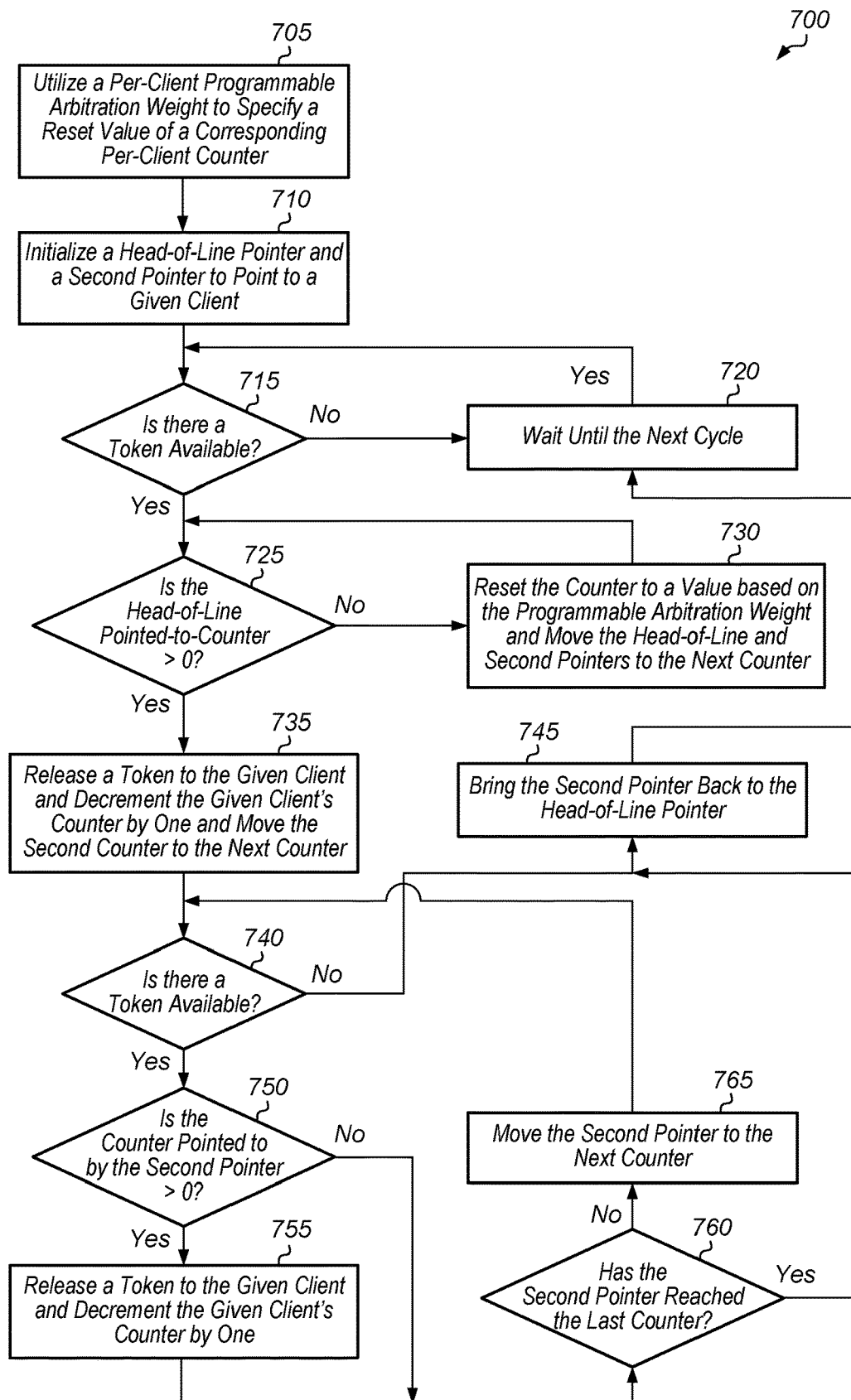
FIG. 7 is a generalized flow diagram illustrating one embodiment of a method for implementing a weighted round-robin arbiter in a token flow control router.

Referring now to FIG. 7, one embodiment of a method 700 for implementing a weighted round-robin arbiter in a token flow control router is shown. A router utilizes a per-client programmable arbitration weight to specify a reset value of a corresponding per-client counter (block 705). The router initializes a head-of-line pointer and a second pointer to point to a given client (block 710). In one embodiment, the head-of-line and second pointers are initialized to point to the client with the highest arbitration weight. In another embodiment, the head-of-line and second pointers are initialized to point to a randomly selected client.

In one embodiment, the router is only able to allocate a single token during a given period of time (e.g., per clock cycle) to a given client. In this embodiment, if there is more than one token available in a given clock cycle, the client pointed to by the head-of-line pointer will be given a first token, and then the second pointer will move through the counters and tokens will be released to other clients in the given clock cycle as long as there are available tokens. In other embodiments, the router can allocate more than a single token per clock cycle to a given client. In these embodiments, if there are multiple tokens available in a clock cycle, then the router will allocate multiple tokens to the client as long as the client's counter is non-zero. However, for the remainder of the discussion of method 700, it will be assumed that the router is only able to allocate a single token per clock cycle to a given client.

After block 710, if there is a token available for allocation (conditional block 715, "yes" leg), then the router determines if the counter pointed to by the head-of-line pointer is greater than zero (conditional block 725). If there are no tokens available for allocation (conditional block 715, "no" leg), the router waits until the next cycle (block 720) and then returns to conditional block 715. If the counter of the given client pointed to by the head-of-line pointer is equal to zero (conditional block 725, "no" leg), then the counter is reset to a value based on the programmable arbitration weight and the head-of-line and second pointers are moved to the next counter (block 730). After block 730, method 700 returns to conditional block 725.

If the counter of the given client pointed to by the head-of-line pointer is greater than zero (conditional block 725, "yes" leg), then the router releases a token to the given client, decrements the given client's counter by one, and moves the second pointer to the next counter (block 735). Next, the router determines if there is another token available (conditional block 740).

If there is not another token available (conditional block 740, "no" leg), then the second pointer is brought back to the head-of-line pointer (block 745). After block 745, the router waits until the next cycle (block 720) before method 700 returns to conditional block 715. If there is another token available (conditional block 740, "yes" leg), then the router determines if the counter pointed to by the second pointer is greater than zero (conditional block 750). If the counter pointed to by the second pointer is greater than zero (conditional block 750, "yes" leg), then the router releases a token to the given client and decrements the given client's counter by one (block 755). After block 755, the router determines if the second pointer has reached the last counter (conditional block 760). If the counter pointed to by the second pointer is equal to zero (conditional block 750, "no" leg), then the router determines if the second pointer has reached the last counter (conditional block 760).

If the second pointer has not reached the last counter (conditional block 760, "no" leg), then the router moves the second pointer to the next counter, and then the router determines if there is still another token available (conditional block 740). If the second pointer has reached the last counter (conditional block 760, "yes" leg), then the second pointer is brought back to the head-of-line pointer (block 745). After block 745, the router waits until the next cycle (block 720) before method 700 returns to conditional block 715.

Figure 8:
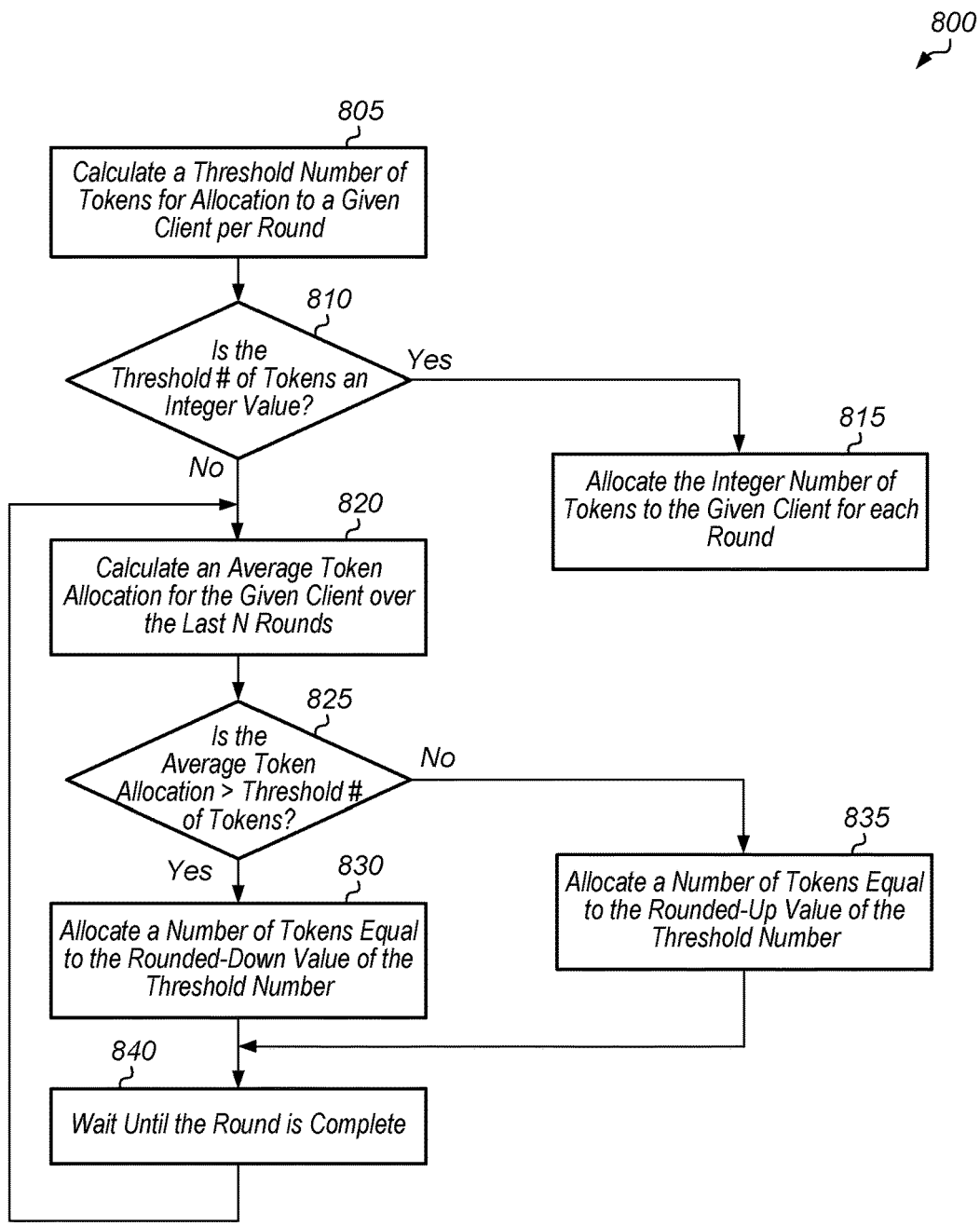
FIG. 8 is a generalized flow diagram illustrating one embodiment of a method for managing non-integer token thresholds.

Turning now to FIG. 8, one embodiment of a method 800 for managing non-integer token thresholds is shown. A router calculates a threshold number of tokens for allocation to a given client per round (block 805). If the threshold number of tokens is an integer value (conditional block 810, "yes" leg), then the router allocates the integer number of tokens to the given client for each round (block 815).

If the threshold number of tokens is a non-integer value (conditional block 810, "yes" leg), then the router calculates an average token allocation for the given client over the last N rounds, wherein N is a programmable value (block 820). If the average token allocation is greater than the threshold number of tokens (conditional block 825, "yes" leg), then the router allocates a number of tokens equal to the rounded-down value of the threshold number (block 830). Otherwise, if the average token allocation is less than or equal to the threshold number of tokens (conditional block 825, "no" leg), then the router allocates a number of tokens equal to the rounded-up value of the threshold number (block 835). After blocks 830 and 835, the router waits until the round is complete (block 840), and then method 800 returns to block 820. In one embodiment, the round is complete when the number of available tokens in the free pool reaches a programmable threshold. It is noted that multiple instances of method 800 can be performed in parallel for routers with multiple clients.

Figure 9:
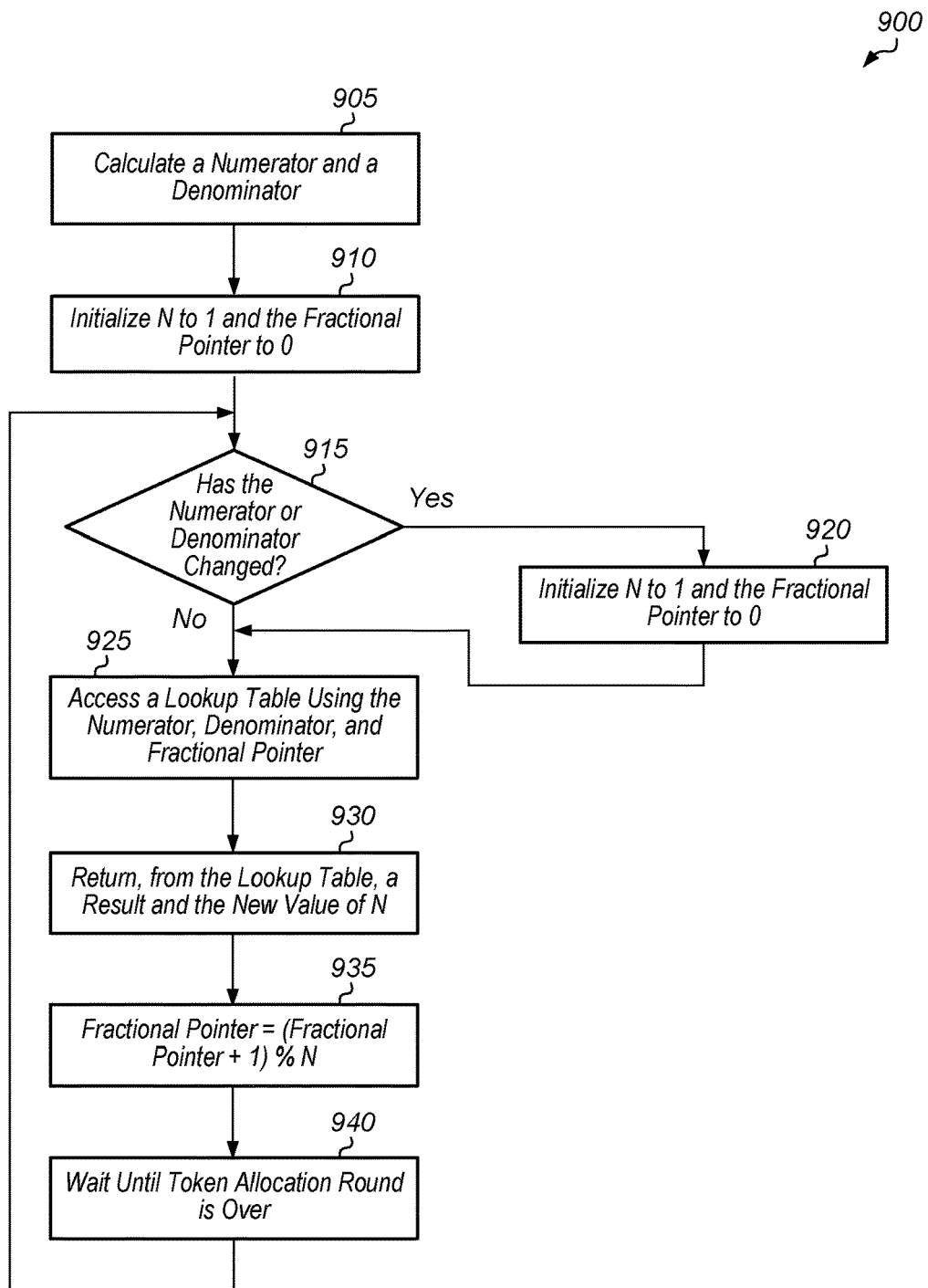
FIG. 9 is a generalized flow diagram illustrating one embodiment of a method for utilizing a fractional pointer to access a lookup table.

Referring now to FIG. 9, one embodiment of a method 900 for utilizing a fractional pointer to access a lookup table is shown. An apparatus (e.g., router 305 of FIG. 3) calculates a numerator and a denominator (block 905). In one embodiment, the numerator is calculated based on an arbitration weight assigned to a client and the denominator is calculated based on a number of clients requesting access to a shared resource. In other embodiments, the numerator and the denominator can be calculated differently based on other factors. Also, the apparatus initializes an N value to 1 and a fractional pointer to 0 (block 910). The N value can also be referred to as the fractional pointer limit.

Next, the apparatus determines if either the numerator or the denominator has changed (conditional block 915). If neither the numerator nor the denominator have changed (conditional block 915, "no" leg), then the apparatus accesses a lookup table using the numerator, denominator, and fractional pointer (block 925). If either the numerator or the denominator has changed (conditional block 915, "yes" leg), then the apparatus initializes the N value to 1 and a fractional pointer to 0 (block 920). After block 920, the apparatus accesses a lookup table using the numerator, denominator, and fractional pointer (block 925). The lookup table returns a result and the new value of N (block 930). If the numerator divided by the denominator is a non-integer value, then the result will be either the rounded-up value of the quotient or the rounded-down value of the quotient. The value of the fractional pointer determines whether the rounded-up or rounded-down value is returned for the lookup. If the quotient is a non-integer value, the result will average out to the actual quotient value when taken over multiple lookups.

Next, the fractional pointer is incremented and compared to N (block 935). If, after being incremented, the fractional pointer is equal to N, then the fractional pointer is reset to 0. Then, the apparatus waits until the token allocation round is over (block 940), and then method 900 returns to conditional block 915. It is noted that method 900 can be performed by the apparatus in cases when a shared resource can only be allocated or consumed in integer portions. The lookup table determines whether the rounded-up or rounded-down value is allocated for each lookup, and over time, the average value provided by the lookup table will converge to the value of the numerator divided by the denominator.

Figure 10:
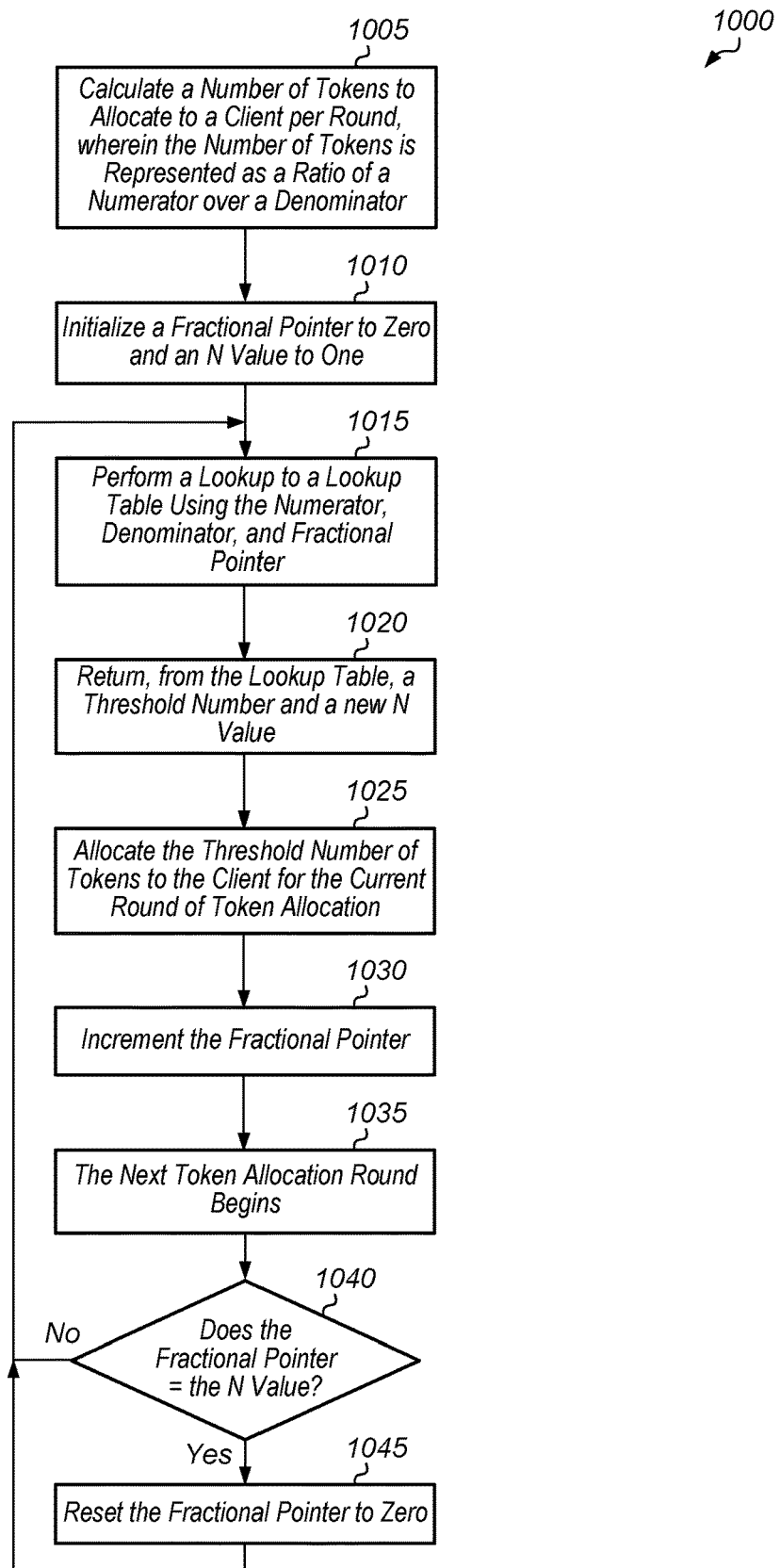
FIG. 10 is a generalized flow diagram illustrating another embodiment of a method for utilizing a fractional pointer to access a lookup table.

Turning now to FIG. 10, another embodiment of a method 1000 for utilizing a fractional pointer to access a lookup table is shown. A router calculates a number of tokens to allocate to a client per round, wherein the number of tokens is represented as a ratio of a numerator over a denominator (block 1005). It is noted that in some instances, the numerator will not be divided evenly by the denominator, in which case the desired number of tokens to be allocated to the client per round is a non-integer number. However, in one embodiment, it is not possible to allocate a fractional token to a client, and so method 1000 is performed such that when calculated over a plurality of rounds, the average number of tokens allocated per round to the client is equal to the actual value of the numerator over the denominator.

Next, the router initializes a fractional pointer to zero and an N value to one (block 1010). Then, the router performs a lookup to a lookup table using the numerator, denominator, and fractional pointer (block 1015). The lookup table returns a threshold number and a new N value (block 1020). Next, the router allocates the threshold number of tokens to the client for the current round of token allocation (block 1025). Then, the router increments the fractional pointer (block 1030). Once the next token allocation round begins (block 1035), if the fractional pointer is equal to the N value (conditional block 1040, "yes" leg), the fractional pointer is reset to zero (block 1045), and then method 1000 returns to block 1015. Otherwise, if the fractional pointer is less than the N value (conditional block 1040, "no" leg), then method 1000 returns to block 1015.

Referring now to FIG. 11, one embodiment of a fractional pointer lookup table 1100 is shown. In one embodiment, a router includes one or more instances of lookup table 1100 for determining how many tokens to allocate to a given client or port per allocation round. In some cases, the router prefers to allocate a non-integer number of tokens per round to the given client or port. However, in one embodiment, only an integer number of tokens can actually be allocated per round. Accordingly, through the use of lookup table 1100, the router is able to achieve an average token allocation per round that over time is equal to the desired non-integer number of tokens. This is achieved by performing lookups to lookup table 1100, with lookup table 1100 indicating when to use the rounded-up value for token allocation and when to use the rounded-down value for token allocation.

Each lookup to lookup table 1100 will provide a numerator, denominator, and fractional pointer, with the combination of these three values the index into table 1100. The output of a lookup to table 1100 will be the result and the N value. The result is the rounded-up or rounded-down value which represents the number of tokens the router should allocate to the given client or for the next round of token allocation. The N value can also be referred to as the fractional pointer limit. After a lookup to table 1100 for a given numerator, denominator, fractional pointer combination, the fractional pointer is incremented by one before the next lookup is performed. If, after being incremented, the fractional pointer is equal to the N value, the fractional pointer is reset to zero prior to the next lookup.

In one embodiment, the constant values that are included in lookup table 1100 are pre-calculated based on the expected numerator and denominator values that will be generated during operation of the router. In one embodiment, the size of lookup table 1100 is minimized by the router reducing the numerator and denominator values prior to performing the lookup. This helps to reduce the total number of entries in lookup table 1100. For example, if the numerator is 4 and the denominator is 2, rather than looking up table 1100 with 4 and 2, these values can be reduced to 2 and 1. Similarly, if the numerator is 12 and the denominator is 8, these values can be reduced to 3 and 2. Other numerator and denominator values can be reduced in a similar manner prior to performing the lookup of lookup table 1100.

In one embodiment, the router includes a lookup table 1100 for each destination of the router. For example, if the router has four destinations, the router would have four lookup tables, with one lookup table per destination. In another embodiment, the router includes a single lookup table 1100, and the lookups for all of the destinations are performed to the single lookup table 1100. Lookup table 1100 can have any number of entries, with the number varying according to the embodiment. In one embodiment, the entries in lookup table 1100 are hard-coded rather than being programmable. As shown in FIG. 11, lookup table 1100 include entries for the numerator, denominator pair of 4, 3 and for the numerator, denominator pair of 7, 5. It should be understood that lookup table 1100 can have any number of other entries which are not shown in FIG. 11 to avoid obscuring the figure.

When the numerator and denominator pair is 4, 3, the first lookup to lookup table 1100 for this pair will be with a fractional pointer of 0. This lookup will output a result of 1 and an N value of 3. As a consequence of this lookup, the router will allocate 1 token to the corresponding client. Next, the router will increment the fractional pointer from 0 to 1, and then the next lookup for the 4, 3 pair will output a result of 1 and an N value of 3. After the second lookup, the router will allocate 1 token to the corresponding client. Next, the router will increment the fractional pointer from 1 to 2, and then the next lookup for the 4, 3 pair will output a result of 2 and an N value of 3. After the third lookup, the router will allocate 2 tokens to the corresponding client. The router will increment the fractional pointer from 2 to 3, and then reset the fractional pointer to 0 since the fractional pointer reached the N value (i.e., fractional pointer limit). Then, the lookups will follow the same pattern again for the next 3 lookups to lookup table 1100 for the numerator and denominator pair of 4, 3. For each set of 3 lookups, the router will allocate a total of 4 tokens, resulting in an average of 1.33 tokens per round.

When the numerator and denominator pair is 7, 5, the first lookup to lookup table 1100 for this pair will be with a fractional pointer of 0. This lookup will output a result of 1 and an N value of 5. After this lookup, the router will allocate 1 token to the corresponding client. Next, the router will increment the fractional pointer from 0 to 1, and then the next lookup to table 1100 for the 7, 5 pair will output a result of 1 and an N value of 5. After the second lookup, the router will allocate 1 token to the corresponding client. Next, the router will increment the fractional pointer from 1 to 2, and then the next lookup to table 1100 for the 7, 5 pair will output a result of 1 and an N value of 5. After the third lookup, the router will allocate 1 token to the corresponding client. Next, the router will increment the fractional pointer from 2 to 3, and then the fourth lookup to table 1100 for the 7, 5 pair will output a result of 2 and an N value of 5. After the fourth lookup, the router will allocate 2 tokens to the corresponding client. Next, the router will increment the fractional pointer from 3 to 4, and then the fifth lookup to table 1100 for the 7, 5 pair will output a result of 2 and an N value of 5. After the fifth lookup, the router will allocate 2 tokens to the corresponding client and the fractional pointer will increment to 5 and then rollover back to 0 since it reached the N value of 5. The next five lookups to table 1100 for the 7, 5 pair will follow the same pattern. As a result of these five lookups to table 1100 for the 7, 5 pair, the router has allocated a total of 7 tokens to the client for an average of 1.4 tokens per round.

It is noted that in other embodiments, lookup table 1100 can be implemented in other suitable manners. For example, in another embodiment, a lookup table does not have to provide the N value for each lookup since the N value will not change for lookups with the same numerator and denominator pair. Also, in a further embodiment, the router can assume that the N value is equal to the denominator. In a still further embodiment, the fractional pointer value can be treated as a remainder value and be incremented by the amount of the remainder when the numerator is divided by the denominator. Other modifications to lookup table 1100 and to the types of lookups that can be performed are possible and are contemplated.

In another embodiment, after reading through a set of entries in lookup table 1100 for a given numerator, denominator pair, the router can store or cache the results in registers, logic, cache, or another storage location to avoid having to perform additional lookups for the given numerator, denominator pair. For example, for the given numerator, denominator pair of 4, 3, the result follows the pattern of 1, 1, and 2 tokens for every set of 3 lookups. In this example, the router could store this pattern and then just follow the pattern when allocating tokens to the corresponding client for as long as the numerator, denominator pair remains 4, 3.

Figure 12:
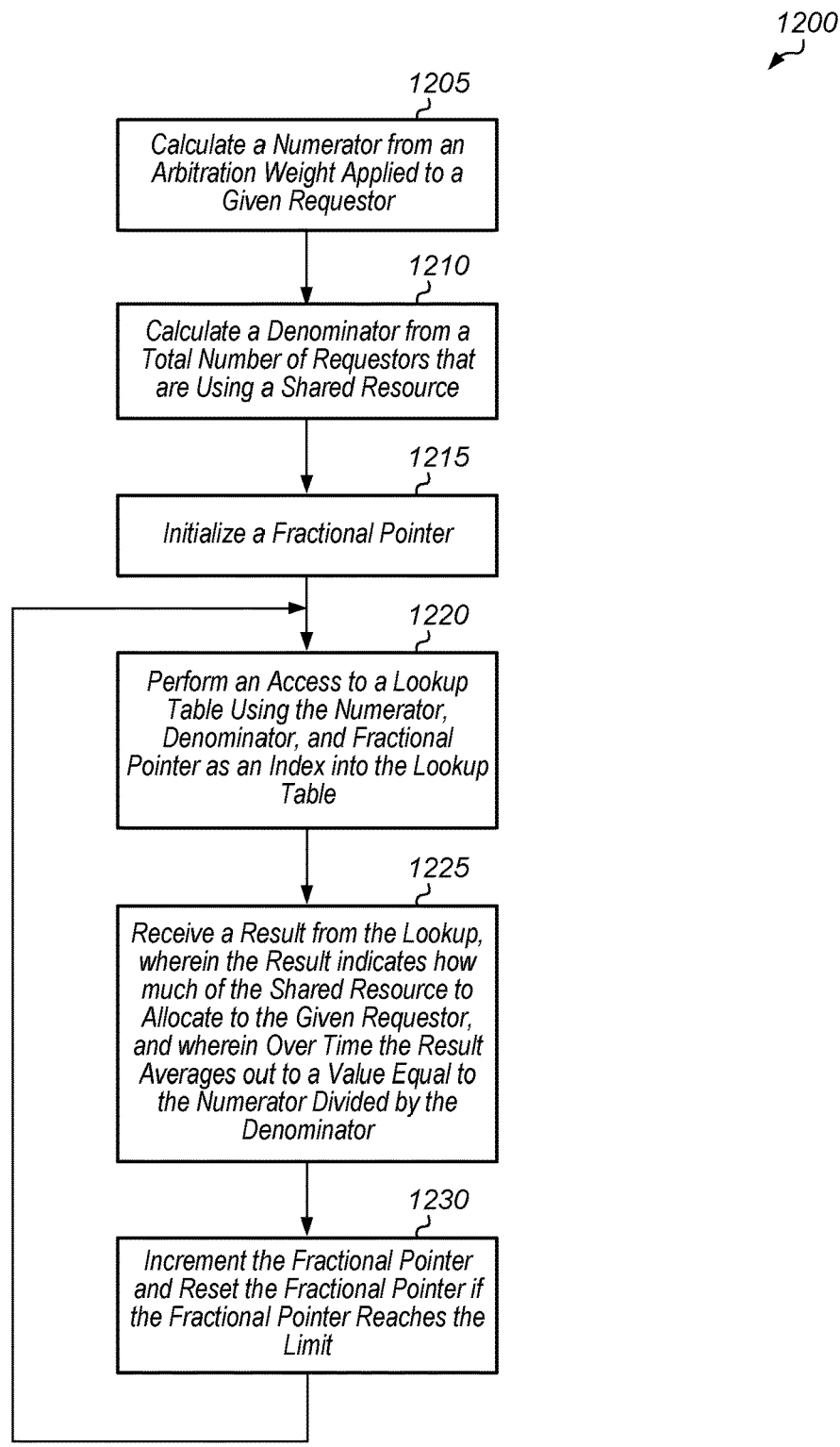
FIG. 12 is a generalized flow diagram illustrating one embodiment of a method for determining how much of a shared resource to allocate to a requestor.

Turning now to FIG. 12, one embodiment of a method 1200 for determining how much of a shared resource to allocate to a requestor is shown. An apparatus (e.g., router 305 of FIG. 3) calculates a numerator from an arbitration weight applied to a given requestor (block 1205). In some cases, the apparatus can also calculate the numerator by multiplying the arbitration weight by an amount of a shared resource (e.g., a number of tokens) which is available for the given requestor. Also, the apparatus calculates a denominator from a total number of requestors that are using a shared resource (block 1210). It is noted that the total number of requestors can be biased using the arbitration weights of the individual requestors. Also, the apparatus initializes a fractional pointer (block 1215). In one embodiment, the fractional pointer is initialized to zero.

Next, the apparatus performs an access to a lookup table using the numerator, denominator, and fractional pointer as an index into the lookup table (block 1220). The apparatus receives a result from the lookup, wherein the result indicates how much of the shared resource to allocate to the given requestor, and wherein over time, the result averages out to a value equal to the numerator divided by the denominator (block 1225). In some embodiments, the apparatus also receives an N value from the lookup table, wherein the N value specifies the fractional pointer limit. Then, the apparatus increments the fractional pointer and resets the fractional pointer if the fractional pointer reaches the limit (block 1230). After block 1230, method 1200 returns to block 1220. It is noted that method 1200 can be performed by the apparatus in cases where the shared resource can only be allocated or consumed in integer portions. In one embodiment, the index into the lookup table determines whether a rounded-up or rounded-down value of the shared resource is allocated, and over multiple lookups, the results provided by the table will average out to a non-integer number.

Figure 13:
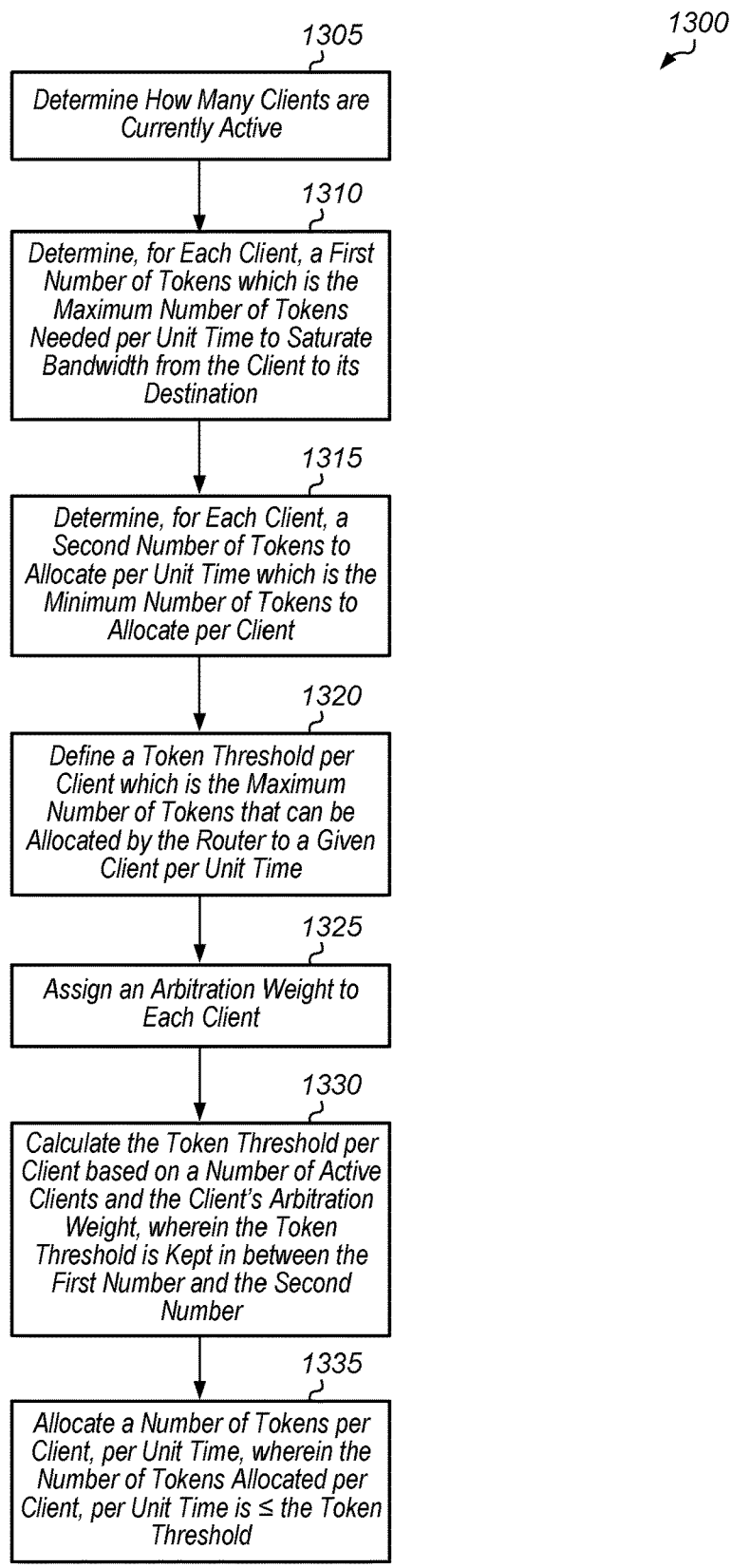
FIG. 13 is a generalized flow diagram illustrating one embodiment of a method for determining a token threshold per client.

Turning now to FIG. 13, one embodiment of a method 1300 for determining a token threshold per client is shown. A router determines how many of its clients are currently active (block 1305). Also, the router determines, for each client, a first number of tokens to allocate per unit time which is the maximum number of tokens needed to saturate bandwidth from the client to its destination (block 1310). In one embodiment, the unit of time is an allocation round for the round-robin arbiter allocating tokens to the clients. In other embodiments, the unit of time can be based on other events (e.g., clock cycles) or other metrics. Next, the router determines, for each client, a second number of tokens to allocate per unit time which is the minimum number of tokens to allocate per client (block 1315).

Also, the router defines a token threshold per client which is the maximum number of tokens that can be allocated by the router to a given client per unit time (block 1320). Additionally, the router assigns an arbitration weight to each client (block 1325). Then, the router calculates the token threshold per client based on a number of active clients and the client's arbitration weight, wherein the token threshold is kept in between the first number and the second number (block 1330). Next, the router allocates a number of tokens to each client per unit time, wherein the number of tokens allocated per client, per unit time is less than or equal to the token threshold (block 1335). After block 1335, method 1300 ends. It is noted that the router can update the token threshold per client as the number of active clients changes and/or if the arbitration weight assigned to a given client changes.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system, comprising:
a plurality of processing units;
a memory; and
a communication fabric coupled to the one or more processing units and the memory, wherein the communication fabric comprises a router configured to:
receive packets from a first client, wherein a first number of tokens per unit time are required to saturate bandwidth from the first client to the router;
statically allocate a second number of tokens per unit time to the first client, wherein the second number of tokens is less than the first number of tokens;
maintain a free pool of tokens for dynamic allocation to a plurality of clients, wherein the plurality of clients includes the first client;
receive packets from the plurality of clients, wherein a corresponding number of tokens per unit time are required to saturate bandwidth from each client of the plurality of clients to the router;
statically allocate a number of tokens per unit time to each client that is less than the corresponding number of tokens per unit time required to saturate bandwidth for the respective client;
determine how many clients targeting a given destination are active; and
calculate a token threshold per client based on the number of active clients, wherein the token threshold for the first client is between the first number and the second number.

2. The system as recited in claim 1, wherein the router is further configured to:
define the token threshold per client as a maximum number of tokens that can be allocated by the router to a given client per unit time; and
wherein the token threshold is further calculated based on an arbitration weight assigned to each client.

3. The system as recited in claim 1, wherein:
the plurality of clients target a common destination; and
a number of tokens in the free pool is equal to the first number subtracted by the second number.

4. The system as recited in claim 1, wherein the first token flow control router is configured to dynamically allocate tokens from the free pool to clients based on a priority level assigned to each client.

5. The system as recited in claim 1, wherein the first token flow control router is configured to dynamically allocate tokens from the free pool to clients based on a bandwidth level requested by each client.

6. The system as recited in claim 1, wherein the router comprises buffers sized to store the second number of packets from each client of the plurality of clients and a number of packets equal to a number of tokens in the free pool.

7. A method, comprising:
receiving packets from a first client, wherein a first number of tokens per unit time are required to saturate bandwidth from the first client to the router;
statically allocating a second number of tokens per unit time to the first client, wherein the second number of tokens is less than the first number of tokens;

maintaining a free pool of tokens for dynamic allocation to a plurality of clients, wherein the plurality of clients includes the first client;

receiving packets from the plurality of clients, wherein a corresponding number of tokens per unit time are required to saturate bandwidth from each client of the plurality of clients to the router;

statically allocating a number of tokens per unit time to each client that is less than the corresponding number of tokens per unit time required to saturate bandwidth for the respective client;

determining how many clients targeting a given destination are active; and calculating a token threshold per client based on the number of active clients, wherein the token threshold for the first client is between the first number and the second number.

8. The method as recited in claim 7, further comprising:

defining the token threshold per client as a maximum number of tokens that can be allocated by the router to a given client per unit time; and wherein the token threshold is further calculated based on an arbitration weight assigned to each client.

9. The method as recited in claim 7, wherein:

the plurality of clients target a common destination; and a number of tokens in the free pool is equal to the first number subtracted by the second number.

10. The method as recited in claim 7, further comprising dynamically allocating tokens from the free pool to clients based on a priority level assigned to each client.

11. The method as recited in claim 7, further comprising dynamically allocating tokens from the free pool to clients based on a bandwidth level requested by each client.

12. The method as recited in claim 7, further comprising maintaining buffers sized to store the second number of packets from each client of the plurality of clients and a number of packets equal to a number of tokens in the free pool.

13. An apparatus, comprising:

a plurality of processing units; and a router;

wherein the router is configured to:

receive packets from a first client, wherein a first number of tokens per unit time are required to saturate bandwidth from the first client to the router;

statically allocate a second number of tokens per unit time to the first client, wherein the second number of tokens is less than the first number of tokens;

maintain a free pool of tokens for dynamic allocation to a plurality of clients, wherein the plurality of clients includes the first client;

receive packets from the plurality of clients, wherein a corresponding number of tokens per unit time are required to saturate bandwidth from each client of the plurality of clients to the router;

statically allocate a number of tokens per unit time to each client that is less than the corresponding number of tokens per unit time required to saturate bandwidth for the respective client;

determine how many clients targeting a given destination are active; and calculate a token threshold per client based on the number of active clients, wherein the token threshold for the first client is between the first number and the second number.

14. The apparatus as recited in claim 13, wherein the router is further configured to:

define the token threshold per client as a maximum number of tokens that can be allocated by the router to a given client per unit time; and wherein the token threshold is further calculated based on an arbitration weight assigned to each client.

15. The apparatus as recited in claim 13, wherein:

the plurality of clients target a common destination; and a number of tokens in the free pool is equal to the first number subtracted by the second number.

16. The apparatus as recited in claim 13, wherein the token flow control router is configured to dynamically allocate tokens from the free pool to clients based on a bandwidth level requested by each client.

17. The apparatus as recited in claim 13, wherein the router comprises buffers sized to store a second number of packets from each client of the plurality of clients and a number of packets equal to a number of tokens in the free pool.

* * * * *